United States Patent Office 3,553,312
Patented Jan. 5, 1971

1

3,553,312
PROCESS FOR PRODUCING RUBELLA-VIRUS HEMAGGLUTINATING ANTIGEN

Sergio N. Delgado, Rockville, Md., assignor to Flow Laboratories Inc., Rockville, Md., a corporation of Delaware No Drawing. Filed Feb. 26, 1968, Ser. No. 707,948
Int. Cl. G01n *33/16;* A61k *23/00*
U.S. Cl. 424—12 14 Claims

ABSTRACT OF THE DISCLOSURE

A process is provided for producing high titer rubella-virus hemagglutinating antigen. Rubella-virus hemagglutinin is first prepared by inoculating a tissue culture of baby hamster kidney cells maintained in a serum-free, nutrient tissue culture fluid with infectious rubella virus and incubating the inoculated cells to propagate the virus in the cells. After incubation, the pH of the fluid is adjusted to between about 9 and 10 to produce high titer rubella-virus hemagglutinin. The antigen is then prepared by destroying the infectivity of the virus without destroying its antigenicity. The antigen is useful in the detection of rubella immunity and rubella infection and in the evaluation of potential rubella vaccines.

This invention relates to the production of an antigen for rubella, and more particularly to a process for producing high concentrations of rubella-virus hemagglutinating antigen.

The recent isolation of rubella virus, which is the causative agent of rubella, has generated considerable work in the synthesis of experimental vaccines for preventing the disease and in the development of tests for the detection of rubella antibodies to evaluate the efficacy of these vaccines.

Originally, these tests were undesirably both complex and time-consuming; and, therefore, more recent work has been directed to the creation of simple and rapid diagnostic test methods that could quickly and accurately determine the existence of rubella infection, the status of rubella immunity, and the efficacy of potential rubella-virus vaccines.

Recently developed serologic test methods for detecting the presence of rubella antibodies include rubella-virus hemagglutination-inhibition tests. These tests are designed to provide a simple, rapid, and inexpensive procedure for the diagnosis of rubella, and have proven very reliable and suitable for large-scale use in diagnostic laboratories.

The potential large-scale use of this new test in nationwide surveys for rubella immunization and rubella vaccine evalution has created the need for larger and larger quantities of the rubella-virus hemagglutinating (HA) antigen that is used in this test. Unfortunately, prior art methods for producing this antigen have generally not been capable of economically or consistently producing the quantities of antigen needed for such large-scale surveys.

One of the best known prior art methods for producing rubella HA antigen is by propagating rubella-virus hemagglutinin (HA) in infectious, rubella-virus inoculated baby hamster kidney (BHK-21) cells. In this method, BHK-21 cells are grown in either monolayer cultures on the sides of stationary or rotating glass bottles or in suspension cultures. Both of these types of cultures are maintained in a serum-free, nutrient tissue culture fluid.

The cell cultures, after inoculation with the virus, are incubated to propagate the virus in the cells. The antigen is harvested by separating the fluid containing the virus from the cellular material in the culture and treating the fluid to destroy the infectivity of the virus.

2

A relatively low titer antigen product is obtained by these methods, however, and this results in extremely high production cost for the rubella virus HA antigen. Thus, while it is possible to obtain culture fluids having antigen titers from 1:16 to as high as 1:64 with such processes, the average titers obtained are generally only around 1:32. The titer of the antigen is a measure of the concentration of the rubella-virus HA antigen in the nutrient medium.

In view of the foregoing, it is a primary object of this invention to provide a new and improved method for the production of rubella-virus hemagglutinin.

Another object of this invention is to provide a method for the production of rubella-virus hemagglutinin that provides higher average concentrations of virus in a tissue culture fluid than has been heretofore possible.

Yet another object of this invention is to provide a method for the efficient and economical production of rubella-virus hemagglutinating antigen.

Still another object of this invention is to provide a new and improved method for the production of high titer rubella-virus hemagglutinating antigen that can be beneficially used in rubella-virus hemagglutination-inhibition tests to detect rubella infection, determine the status of rubella immunity, and test the efficacy of potential rubella-virus vaccines.

A further object of this invention is to provide a new and improved method for producing high titer rubella-virus hemagglutinating antigen from infectious rubella-virus inoculated baby hamster kidney cells.

Additional objects and advantages will be set forth in part in the description which follows and in part will be obvious from the description or may be learned by practice of the invention, the objects and advantages being realized and attained by means of the methods, processes, and improvements particularly pointed out in the appended claims.

To achieve the foregoing objects and in accordance with its purpose, this invention, as embodied and broadly described, provides a process for the production of rubella-virus hemagglutinin which comprises, inoculating mammalian tissue cells with infectious rubella virus, providing the inoculated cells with a hemagglutinin growth inhibitor-free nutrient tissue culture fluid capable of supporting growth of the cells, and incubating the inoculated cells at a temperature of between 30 to 42° C. and for a period of from about 4 to 8 days to propagate the virus in the cells. After incubation the fluid containing rubella-virus hemagglutinin is separated from the cellular material in the culture and the pH of the fluid is adjusted to between about 9 and 10 to produce high titer rubella-virus hemagglutinin.

A preferred process for producing rubella-virus hemagglutinin, according to the process of this invention, comprises the steps of:

(a) inoculating a first culture of mammalian tissue cells with infectious rubella virus,
(b) providing the inoculated cells with a serum containing, nutrient tissue culture fluid capable of supporting growth of the cells,
(c) incubating the inoculated culture at a temperature of from about 30 to 42° C. and for a period of from about 4 to 8 days to propagate the virus in the cells,
(d) adjusting the pH of the fluid to between about 9 and 10,
(e) inoculating a second culture of mammalian tissue cells with the infectious rubella virus produced in the first culture,
(f) providing the inoculated second culture with a hemagglutinin growth inhibitor free nutrient tissue culture fluid capable of supporting growth of the cells, (g) incubating the inoculated second culture at a temperature of about 30 to 42° C. and for a period of about 4 to 8 days to propagate the virus in the cells, (h) separating the fluid containing rubella-virus hemagglutinin from the cellular material in the second culture, and (i) adjusting the pH of the fluid to between about 9 and 10 to produce high titer rubella-virus hemagglutinin.

In a more preferred embodiment of this invention the first culture for the production of infectious rubella virus is a suspension culture and the second culture for the production of rubella-virus hemagglutinin is a monolayer culture.

The antigen can then be prepared by conventional techniques in which the infectivity of the rubella-virus hemagglutinin is destroyed without destroying its antigenicity.

It is to be understood that both the foregoing general description and the following detailed description are exemplary and explanatory but are not restrictive of the invention.

The mammalian cells that are useful in the process of this invention for producing high concentrations of rubella-virus hemagglutinin in a tissue culture fluid can be any one of a wide variety of cell lines capable of propagating rubella virus. A preferred cell line is baby hamster kidney cells, particularly the BHK-21 cell line. These cells are preferred because of their excellent growth rate and their susceptibility to the rapid propagation of rubella virus. Other cell lines that can also be used include embryonic human lung fibroblasts, cornea of rabbits, monkey kidney cells, ferret lung fibroblasts, and the like.

In accordance with a preferred embodiment of this invention, BHK-21 cells are grown by suspending the cells in a nutrient tissue culture fluid and incubating the suspended culture at a temperature between 30 and 42° C., and preferably between 34 and 37° C., with spinning. The fluid can be any suitable nutrient medium that supports the growth of the cells, and preferably is Eagle's basal medium (BME) (Eagle, Science, vol. 122, pp. 501–504, 1955) that has been modified to contain twice the normal concentration of amino-acids and vitamins, with 6% Seitz- or millipore-filtered fetal bovine serum and 10% tryptose phosphate broth. Incubation preferably is continued until there are about 2.5 million cells per milliliter of the tissue culture fluid.

The cell culture suspension is then inoculated with a suitable amount of inoculum (for example, 100 ml. of inoculum per liter of sample) containing undiluted infectious rubella virus having a titer of about $10^{-7}$ TCID$_{50}$/ml. As an inoculum for the suspension culture of BHK-21 cells, one can use any liquid containing live, infectious rubella virus. For example, one can use non-attenuated or virulent forms of the virus, or a tissue culture fluid containing such forms of the virus.

After an adsorption period of approximately 2 hours, the inoculated cells are re-suspended in fresh nutrient tissue culture fluid (preferably BME modified as described above) and again incubated at a temperature between 30 and 42° C., and preferably at 35° C., with spinning. After about 3 days the suspension should be replenished, such as by adding another liter of tissue culture fluid for every liter of inoculated cell culture fluid present in the suspension. After this replenishment, incubation is continued for another 1 to 2 days to permit maximum propagation of the virus in the cells to be achieved, without destruction of the cells. Generally, incubation is continued until the fifth day from inoculation, at which time the highest titer of virus particles in the tissue fluid culture can be obtained without deterioration of the infectivity of the virus.

In accordance with this invention, and at the end of the incubation period, the pH of the inoculated tissue culture is adjusted to between about 9 and 10, and preferably to about 9.5, and immediate thereafter the culture is subjected to freezing temperatures at about $-80°$ C. The pH of the fluid can be adjusted by adding the required amounts of an alkaline material, such as sodium hydroxide, ammonium hydroxide, or the like. After approximately 24 hours at $-80°$ C., or as soon as the cells have died, the suspension culture is thawed to about 4 to 6° C. and is held at this temperature for about 24 to 30 hours.

During this thawing period the sticky cell-bound virus particles are freed from the dead cells into the tissue culture fluid, resulting in a tissue culture fluid containing infectious rubella virus.

In accordance with this invention, it has been found that adjustment of the pH of the suspension culture to between about 9 and 10 after incubation causes the virus particles to be more readily released from the dead tissue culture cells, and substantially prevents clumping together of the virus particles in the tissue culture fluid thereby increasing the infectivity of the virus-containing fluid.

Additionally, adjustment of the suspension pH to about 9 to 10 causes, the dead cell debris to tend to aggregate in clumps and fall to the bottom of the container, thus permitting easy separation if desired of the tissue culture fluid containing infectious rubella virus from the solid debris in the suspension culture. The resulting pH adjusted tissue culture fluid therefore contains a high concentration of infectious rubella virus.

During the growth of rubella virus in the suspension culture of BHK-21 cells, additional BHK-21 cells for use in the production of rubella HA antigen are grown either in similar suspension cultures or in monolayer cultures on the sides of stationary glass bottles or roller tubes. A similar nutrient tissue culture fluid, preferably modified BME is used, and the cells are incubated until the desired culture of BHK-21 cells is produced. A process for growing cells in roller tubes suitable for use in the process of this invention is described in the copending application, Ser. No. 482,271 of John A. Welsh et al., entitled "Method for Cell Propagation."

In accordance with a preferred embodiment of this invention, the second culture of BHK-21 cells are prepared by suspending the cells, in a fluid nutrient medium in roller tubes with the fluid nutrient medium occupying substantially less than the full volume of the tubes. The tubes are then placed in an incubator operating at a temperature of from about 34 to 35° C. and rotated at a speed of about nine (9) revolutions per hour to permit the fluid to come into contact with substantially the entire inner surfaces of the tube. During incubation, the cells become attached to the inner walls of the roller tubes and are intermittently immersed in the nutrient fluid. The cells thus uniformly distribute themselves around the inner walls of the tube forming a confluent monolayer sheet of cells on the inside of the tube.

After the cells have grown to about 140 million per tube, the nutrient medium is poured off and 90 ml. of the tissue culture fluid from the suspension culture containing live, infectious rubella virus is aded to each roller tube as the inoculum for the cells. After an adsorption period of about 2 hours at a temperature of about 34 to 35° C., the cells are properly infected for propagation of rubella-virus hemagglutinin, and the inoculum fluid is poured off.

The inoculum fluid from the suspension culture can be reused many times to infect additional monolayer tissue cultures in roller tubes. Use of the fluid should be discontinued when its titer decreases to a value of about $10^{-5}$.

After the inoculum fluid is removed, the inoculated monolayer tissue cultures are rinsed with a neutral salt solution, such as 1–X Hanks basal salt solution to cleanse the inoculated culture of the HA growth inhibitor serum in the inoculum. A hemagglutinin growth inhibitor-free nutrient tissue culture medium, such as serum-free Eagle's basal medium (BME), is then added to each roller tube. The nutrient medium is preferably modified to contain 1% glutamine, 2% penicillin and streptomycin, 2% amino-acids, and 1% nonessential amino-acids to provide an optimum nutritional medium for propagation of rubella-virus hemagglutinin. The inoculated monolayer cultures are then incubated at a temperature favorable to propagation of the virus in the cells, generally between about 30 and 42° C.

Approximately 24 hours after inoculation, the nutrient fluid should be discarded and fresh fluid, similar to that described above, added to each tube. Incubation of the inoculated cells is continued for about 4 to 8 days, with constant rotation of the tubes to permit maximum propagation of the virus in the cells. In most instances, maximum concentration of the virus can be obtained after incubation has continued for 5 days. The virus is then harvested by pouring off the virus-containing supernate from each roller tube.

In accordance with this invention, the pH of the harvested fluid is adjusted to between about 9 and 10, and preferably to about 9.5 by the addition of an alkaline material such as sodium hydroxide. This pH adjustment acts to improve the titer of the virus by preventing the virus particles from clumping together in the fluid. The virus is then refrigerated at about 4 to 6° C. for about 24 to 30 hours before preparation of the antigen.

The resulting tissue culture fluid contains a high concentration of live rubella-virus hemagglutinin having titers within the range of from 1:32 to 1:256. Part of this fluid can be reused, if desired, as the inoculum for the suspension culture.

The antigen, which is useful in the rubella-virus hemagglutination-inhibition test, is then prepared from the cultured rubella-virus hemagglutinin by conventional Tween 80-ether treatment. In this treatment, the infectivity of the virus is destroyed without destroying its antigenicity.

Tween 80 (a surfactant produced by Hill Top Laboratories, Inc., Cincinnati, Ohio), or an equivalent composition, is first added to the virus-containing fluid in such proportions that the resulting solution contains approximately .125% Tween 80. After 3 to 4 minutes of stirring at approximately 4° C., one-half volume of ethyl ether (½ ml. for every ml. of the Tween 80-culture fluid solution) is added and the stirring is continued for another 15 minutes at this temperature. The solution is then centrifuged for 30 minutes at this temperature and at 2000 revolutions per minutes to separate the culture fluid or aqueous layer from the ether layer. The ether phase is discarded and residual ether is removed by bubbling nitrogen through the antigen-containing aqueous layer for several hours at room temperature.

The antigen-containing fluid can then be stored routinely at −60° C. for future use in the detection of rubella infection, the status of rubella immunity, and the evaluation of potential rubella vaccines.

While a preferred method for producing high titer rubella virus HA antigen has been described by first producing infective rubella virus as a seed virus in a suspension culture and then producing rubella-virus hemagglutinin in monolayer cultures from this seed virus, it will be understood from the above description that the process of this invention may also be used with other types of cell cultures. For example, the seed virus may be produced in monolayer cultures and the rubella-virus hemagglutinin in a suspension culture, or both viruses may be produced in suspension cultures without departing from the scope of this invention.

To illustrate the invention more specifically, reference is now made to the following examples. The examples illustrate the preparation of rubella-virus hemagglutinating antigen according to the preferred process of this invention.

The examples are merely illustrative and are not to be understood as limiting the scope and underlying principles of the invention in any way.

EXAMPLE 1

Preparation of suspension tissue culture fluid containing live, infectious rubella virus A culture of BHK-21 cells is cultivated in a suspension culture containing 1000 ml. of Eagle's basal medium modified to contain twice the original concentration of amino-acids and vitamins, with 6% Seitz-filtered bovine serum and 10% tryptose phosphate broth. Antibiotics are also incorporated to provide concentrations of 100 units of penicillin and streptomycin, 25 units of mycostatin, and 70 units of neomycin per ml. of medium. The cells are cultivated until there are approximately 2.5 million cells per ml. of the medium by spinning the culture at 200 r.p.m. and at a temperature of 37° C.

100 ml. of an inoculum containing live rubella virus having a titer of $10^{-7}$ TCID$_{50}$/ml. is then added to a 1-liter sample of the suspension culture, and the culture is incubated at 34° C. for about 5 days, with continued spinning. After 3 days, another liter of medium is added to each sample so that there are 2 liters of fluid containing virus-infected tissue culture cells in each sample.

After 5 days, sodium hydroxide is added to each sample to raise the pH to 9.5, and immediately thereafter the sample is placed in a freezer operating at −80° C. The sample is left in the freezer overnight and then thawed to a temperature of about 5° C. The sample is maintained at this temperature for 24 hours during which time the dead cell debris forms large clumps in the bottom of the container. The virus-containing inoculum fluid is then decanted and stored under refrigeration for future use.

EXAMPLE 2

Preparation of monolayer tissue culture

BHK-21 cells are added to glass roller tubes containing 250 ml. of a nutrient tissue culture medium to provide an average density of $1 \times 10^5$ cells/ml. of the medium. The nutrient medium is Eagle's basal medium modified to contain twice the original concentration of amino-acids and vitamins plus 10% fetal bovine serum, 10% tryptose phosphate broth and 4.5 gm. of glucose/liter. The cells are incubated at 35° C., with rotation of the tubes until there are approximately 140 million cells attached as a confluent monolayer on the sides of each roller tube. The nutrient medium is then decanted and the cells are inoculated with the final inoculum product of Example 1.

EXAMPLE 3

Preparation of rubella-virus hemagglutinin

Ninety (90) ml. of the virus-containing inoculum prepared in Example 1 is added to each roller tube containing a monolayer of BHK-21 cells grown according to the procedure of Example 2.

The inoculated cells are incubated for about 2 hours at 35° C. to infect the cells and then the inoculant is decanted. The inoculated cell sheets are rinsed in 1-X Hanks basal salt solution, and 200 ml. of serum-free Eagle's basal medium modified to contain twice its original concentration of amino-acids and vitamins is added to each tube. After 24 hours, the medium is poured off and 200 ml. of fresh, similarly modified medium is added.

Incubation at 34° C. is continued with rotation of the roller tubes until 5 days have elapsed from the time of inoculation. At the end of the incubation period the rubella-virus hemagglutinin is harvested by pouring off the fluid supernate. The pH of the fluid is then adjusted to 9.5 by the addition of the required amounts of sodium hydroxide and the supernate is refrigerated at 4° C. for about 24 hours, before preparation of the antigen.

EXAMPLE 4

Preparation of rubella-virus hemagglutinating antigen

To prepare the antigen, 0.125 ml. of undiluted Tween 80 is added per every 100 ml. of supernate. After stirring for 3 minutes at 4° C., approximately 50 ml. of ethyl ether is added for every 100 ml. of Tween 80-culture fluid solution and the stirring is continued for another 15 minutes while maintaining the solution at 4° C. The solution is then centrifuged at 2000 r.p.m. for 30 minutes, and the aqueous phase is collected under the ether phase, and the ether phase is discarded. Residual ether is removed by bubbling nitrogen through the antigen-containing aqueous phase for several hours at room temperature. The resultant aqueous solution contains rubella-virus hemagglutinating antigen having a titer of between about 1:32 to 1:256.

The invention in its broader aspects is not limited to the specific details shown and described, and departures may be made from such details within the spirit and scope of the accompanying claims without departing from the principles of the invention and without sacrificing its chief advantages.

What is claimed is:

1. A process for producing rubella-virus hemagglutinin in a tissue culture fluid, which comprises inoculating a tissue culture of baby hamster kidney cells with infectious rubella virus, providing the inoculated cells with a hemagglutinin growth inhibitor-free nutrient tissue culture fluid capable of supporting growth of the cells, incubating the inoculated culture at a temperature between about 30 to 42° C. for from 4 to 8 days to propagate the virus in the cells, separating the fluid containing rubella-virus hemagglutinin from the cellular material in the culture, and adjusting the pH of the fluid to from about 9 to 10 to produce high titer rubella-virus hemagglutinin.

2. The process of claim 1, wherein the pH of the tissue culture fluid is adjusted to about 9.5.

3. The process of claim 1, wherein sodium hydroxide is added to the tissue culture fluid to raise the pH of the fluid to between about 9 and 10.

4. The rubella-virus hemagglutinin containing tissue culture fluid produced by the process of claim 1.

5. The process of claim 1, wherein the tissue culture is a monolayer culture attached to the inner wall surface of a roller tube, and the inoculated culture is incubated while revolving the tube at a speed of from 6 to 9 revolutions per hour.

6. The process of claim 1, which includes preparing rubella-virus hemagglutinating antigen by treating the fluid with ether to separate out any remaining cellular material from the fluid and to destroy the infectivity of the rubella-virus hemagglutinin without destroying its antigenicity.

7. The rubella-virus hemagglutinating antigen produced by the process of claim 6.

8. A process for producing rubella-virus hemagglutinin which comprises:
   (a) inoculating a first tissue culture of baby hamster kidney cells with infectious rubella-virus,
   (b) providing the inoculated cells with a serum-containing nutrient tissue culture fluid capable of supporting growth of the cells,
   (c) incubating the inoculated tissue culture at a temperature of from about 30 to 42° C. for about 4 to 8 days to propagate the virus in the cells,
   (d) adjusting the pH of the fluid to about 9 to 10,
   (e) inoculating a second tissue culture of baby hamster kidney cells with the infectious rubella-virus produced in the first culture,
   (f) providing the second culture with a hemagglutinin growth inhibitor-free nutrient tissue culture fluid capable of supporting growth of the cells,
   (g) incubating the inoculated second culture at a temperature of from about 30 to 42° C. for about 4 to 8 days to propagate the virus in the cells,
   (h) separating the fluid containing rubella-virus hemagglutinin from the cellular material in the second culture, and
   (i) adjusting the pH of the tissue culture fluid to about 9 to 10 to produce high titer rubella-virus hemagglutinin.

9. The process of claim 8, which includes preparing rubella-virus hemagglutinating antigen by treating the fluid with ether to separate out any remaining cellular material in the fluid and to destroy the infectivity of the rubella-virus hemagglutinin without destroying its antigenicity.

10. The process of claim 8, wherein the first cell culture is a suspension culture and the second cell culture is a monolayer culture.

11. The process of claim 10, wherein the pH of the suspension tissue culture fluid and the monolayer tissue culture fluid are each adjusted to about 9.5.

12. The process of claim 10, wherein the monolayer tissue culture is attached to the inner wall surface of a roller tube and the inoculated monolayer culture is incubated while revolving the tube at a speed of from 6 to 9 revolutions per hour.

13. A process for producing rubella-virus hemagglutinin in a tissue culture fluid, which comprises inoculating a tissue culture of baby hamster kidney cells with infectious rubella-virus, providing the inoculated cells with a hemagglutinin growth inhibitor-free nutrient tissue culture fluid capable of supporting growth of the cells, incubating the inoculated culture at a temperature between about 30 to 42° C. for from 4 to 8 days to propagate the virus in the cells, and adjusting the pH of the fluid to from about 9 to 10 to produce high titer rubella-virus hemagglutinin.

14. A process for producing rubella-virus hemagglutinin which comprises:
   (a) inoculating a first tissue culture of baby hamster kidney cells with infectious rubella-virus,
   (b) providing the inoculated cells with a serum-containing nutrient tissue culture fluid capable of supporting growth of the cells,
   (c) incubating the inoculated tissue culture at a temperature of from about 30 to 42° C. for about 4 to 8 days to propagate the virus in the cells,
   (d) adjusting the pH of the fluid to about 9 to 10,
   (e) inoculating a second tissue culture of baby hamster kidney cells with the infectious rubella-virus produced in the first culture,
   (f) providing the second culture with a hemagglutinin growth inhibitor-free nutrient tissue culture fluid capable of supporting growth of the cells,
   (g) incubating the inoculated second culture at a temperature of from about 30 to 42° C. for about 4 to 8 days to propagate the virus in the cells, and
   (h) adjusting the pH of the tissue culture fluid to about 9 to 10 to produce high titer rubella-virus hemagglutinin.

References Cited

UNITED STATES PATENTS 3,449,488    6/1969    Bozicevith ---------- 424—89

SAM ROSEN, Primary Examiner

U.S. Cl. X.R.

195—1.1; 424—89